US012792835B2

(12) United States Patent
Bank et al.

(10) Patent No.: US 12,792,835 B2
(45) Date of Patent: Nov. 10, 2026

(54) USER-CENTRIC CONVERSION OF NATURAL LANGUAGE RESPONSES TO POTENTIAL MULTIPLE CHOICE STATEMENTS

(71) Applicant: BTS USA, INC., San Francisco, CA (US)

(72) Inventors: Jurgen Bank, Philadelphia, PA (US); Brad Chambers, Liberty Township, OH (US); Nikhil Mishra, Maharashtra (IN); Carl Greenwood, Portsmouth (GB)

(73) Assignee: BTS USA, INC., San Francisco, CA (US)

(*) Notice: Subject to any disclaimer, the term of this patent is extended or adjusted under 35 U.S.C. 154(b) by 575 days.

(21) Appl. No.: 17/962,917

(22) Filed: Oct. 10, 2022

(65) Prior Publication Data

US 2023/0116804 A1 Apr. 13, 2023

Related U.S. Application Data

(60) Provisional application No. 63/253,586, filed on Oct. 8, 2021.

(51) Int. Cl.

| | |
|---|---|
| ***G06F 40/30*** | (2020.01) |
| ***G06F 3/0482*** | (2013.01) |
| ***G06F 40/247*** | (2020.01) |

(52) U.S. Cl.
CPC ............ *G06F 40/30* (2020.01); *G06F 3/0482* (2013.01); *G06F 40/247* (2020.01)

(58) Field of Classification Search
CPC .... G06F 16/3329; G06F 40/30; G06F 3/0482; G06F 40/20; G06F 40/205; G06F 40/211; G06F 40/247; G06F 40/284; G06F 40/289; G06F 40/35; G06F 40/40; G06F 16/243; G06F 16/24522; G06F 16/3344; G10L 15/22
See application file for complete search history.

(56) References Cited

U.S. PATENT DOCUMENTS

| | | | | |
|---|---|---|---|---|
| 9,424,247 | B1 * | 8/2016 | Tomkins | G06F 40/30 |
| 11,386,897 | B2 * | 7/2022 | Singh | G10L 15/22 |
| 2016/0063381 | A1 * | 3/2016 | Allen | G06F 16/33 706/11 |
| 2019/0139435 | A1 * | 5/2019 | Kim | H04L 12/1827 |
| 2020/0357297 | A1 * | 11/2020 | Kim | G06Q 10/101 |
| 2021/0149964 | A1 * | 5/2021 | Wang | G06N 20/00 |

* cited by examiner

*Primary Examiner* — Andrew C Flanders
(74) *Attorney, Agent, or Firm* — Blank Rome LLP

(57) ABSTRACT

While multiple-choice questions can be used to objectively assess individuals, presenting individuals with potential responses in a multiple-choice format can unintentionally influence the individual answering the question. Accordingly, the disclosed system provides functionality for users to answer questions using natural language and identifies the potential responses to those questions that are most similar to the natural language responses provided by the users. To assess users who use different dialects, the system includes a universal sentence encoder that recognizes semantic concepts regardless of the dialect used by those users.

12 Claims, 4 Drawing Sheets

USER-CENTRIC CONVERSION OF NATURAL LANGUAGE RESPONSES TO POTENTIAL MULTIPLE CHOICE STATEMENTS

CROSS-REFERENCE TO RELATED APPLICATIONS

This application claims priority to U.S. Provisional Pat. Appl. No. 63/253,586, filed Oct. 8, 2021, which is hereby incorporated by reference.

FEDERAL FUNDING

None

BACKGROUND

Multiple-choice questions are used in countless situations to assess the knowledge and recall of individuals, to receive feedback from individuals, etc. In the field of business consulting and leadership development, for example, an organization may wish to assess the leadership capability and/or business acumen of their employees or prospective employees. To make those assessments, individuals may be given multiple-choice questions.

Multiple-choice questions allow a large number of individuals to be assessed efficiently and objectively. Each potential response to each question may be given a score, with correct or more desirable responses having higher scores than less desirable or incorrect responses. Individuals may then be assessed by summing the scores of the responses they select to the multiple-choice questions.

By providing individuals with potential responses, however, multiple-choice questions can influence the individual answering the question. Some individuals may be prompted to select a response that they would not have even considered on their own. Additionally, some individuals may (consciously and/or subconsciously) attempt to identify the response that is preferred by those doing the assessment rather than a response that occurs naturally to the individual being assessed and is preferred by the individual being assessed. Additionally, the potential responses may be unintentionally constructed in a way that causes some individuals to avoid or select that response (e.g., if the response is unintentionally confusing or unintentionally uses language than is more polished than the other potential responses to the question). Accordingly, the responses individuals select after being presented with multiple-choice questions may be meaningfully different than the responses they would have provided if those questions were open ended.

At the same time, computer-implemented methods of evaluating natural language responses to open ended questions can be challenging. Existing natural language processing methods (e.g., keyword detection) are imprecise tools for identifying the precise concept that an individual is attempting to convey using natural language. As a result, an individual may attempt to convey a concept that the assessor considers correct but use words or phrases that a natural language system incorrectly interprets. Evaluating natural language responses to open ended questions using natural language processing can be particularly challenging when individuals do not use the language in the same way or use the same dialect.

In some instances, it is desirable to assess the capabilities of individuals to make decisions in situations where they are not provided with a limit set of potential options. Similarly, in some instances, it is desirable to receive feedback from individuals without influencing that feedback by prompting the individual to consider a number of potential responses. In all of those instances, however, it is desirable to maintain the efficiency and objectivity of processes that use multiple-choice questions. Meanwhile, it is desirable to recognize the concepts being conveyed by those individuals regardless of the dialect used by those individuals.

SUMMARY

Disclosed is a system that presents process questions to users. The system stores a number of potential responses to each question. Rather than displaying potential responses to each question, however, the system provides functionality for the users to provide a natural language response. The system uses natural language processing to select the potential responses to the question that are most similar to the natural language response provided by the user and presents them to the user as a set of multiple-choice statements. The system provides functionality for the users to select one of the multiple-choice statements as their response to the process question (or revise their natural language response in order to generate a new set of multiple-choice statements).

Each potential response to each process question may be associated with a score indicative of whether that potential response is preferred relative to the other potential responses to that process question. Therefore, the system is able to efficiently assess a large number of users, using objective criteria that remains consistent across all users, by summing the scores of the responses provided by each user. Additionally, because users respond to the process questions using natural language and are only presented with multiple-choice statements that are similar to their natural language responses, the system prevents potential responses to each process question from influencing the response provided by the user. Meanwhile, the system is able to recognize the concepts being conveyed by those natural language responses regardless of the dialect used by those users. Accordingly, the system is better able to assess the capacity of users to make decisions in situations where they are not presented with a limit set of options.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments.

DETAILED DESCRIPTION

Figure 1:
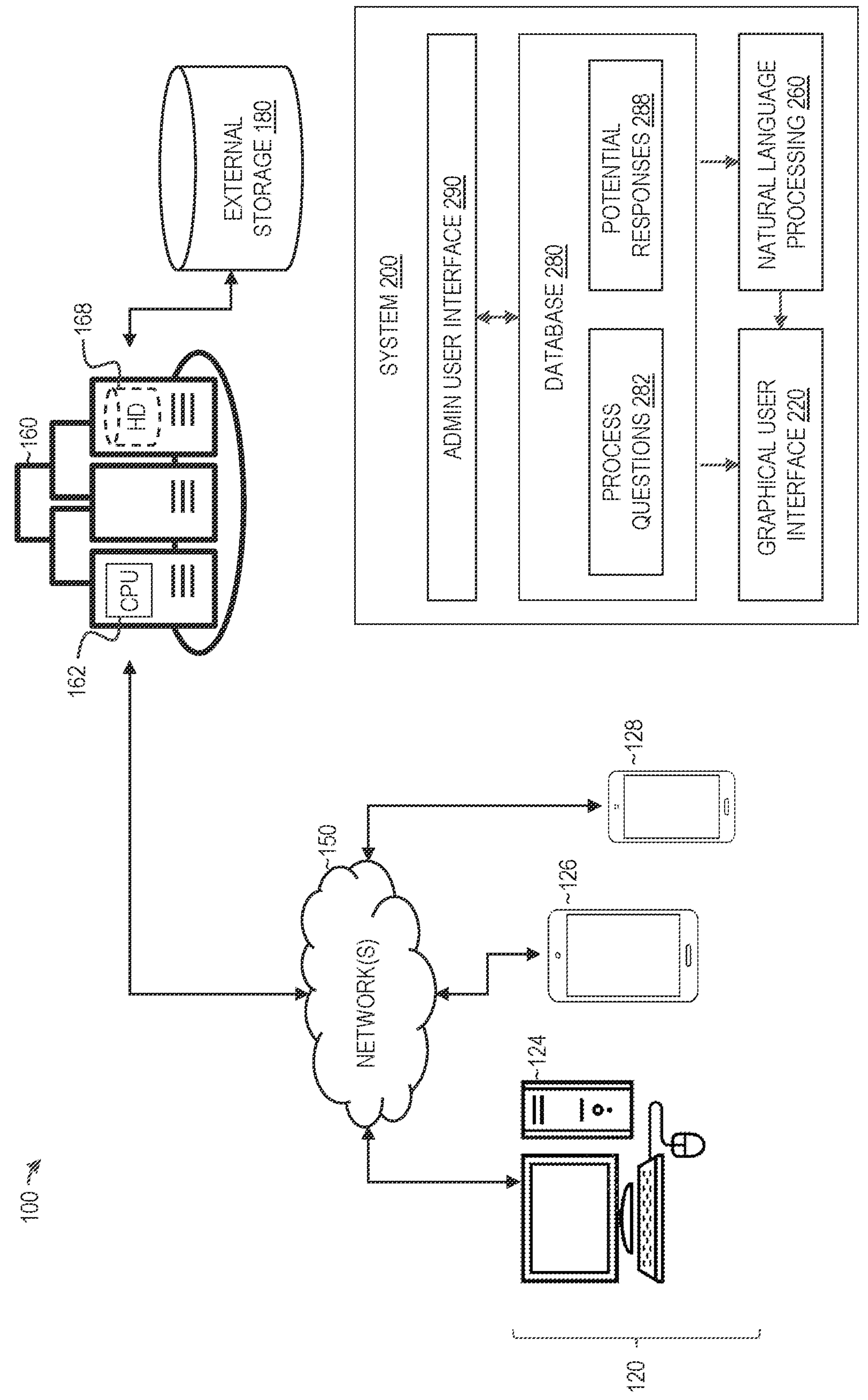
FIG. 1 is a diagram of an architecture of a system for converting natural language responses to potential multiple-choice statements according to an exemplary embodiment.

Reference to the drawings illustrating various views of exemplary embodiments is now made. In the drawings and the description of the drawings herein, certain terminology is used for convenience only and is not to be taken as limiting the embodiments of the present invention. Furthermore, in the drawings and the description below, like numerals indicate like elements throughout.

FIG. 1 is a diagram of an architecture 100 for a system 200 for converting natural language responses to potential multiple-choice statements according to an exemplary embodiment.

As shown in FIG. 1, the architecture 100 includes a server 160 that communicates with remote devices 120 via one or more networks 150. As described in further detail below with reference to FIG. 2, the system 200 includes an admin user interface 290, a database 280, a natural language processing module 260, and a graphical user interface 220.

The server 160 may be any suitable computing device capable of performing the functions described herein. The server 160 may be, for example, a web server, an application server, a mobile application server, etc. The server 160 includes at least one hardware computer processor 162 and non-transitory computer readable storage media 168. The hardware computer processor(s) 162 may include, for example, a central processing unit (CPU). The non-transitory computer readable storage media 168 may include, for example, a hard drive (HD). The computer readable storage media 168 may be internal to the server 160 and may store software instructions that, when executed by the hardware computer processor(s) 162, cause the server 160 to perform the functions described herein.

In addition to the internal computer readable storage media 168, the server 160 may be connected to external storage 180, for example via a wired connection, a local area network, a wide area network, etc. The external storage 180 may be any non-transitory computer readable storage media, such as a hard drive, flash storage, cloud storage, etc.

The one or more networks 150 may a include local area network, a wide area network (e.g., the Internet), a cellular network, etc. The network(s) 150 may include wired or wireless connections.

The graphical user interface 220 may be any user interface that provides functionality for users of the system 200 to view and provide information as described herein. Similarly, the admin user interface 290 may be any user interface that provides functionality for administrators of the system 200 with the proper login credentials to view and provide information as described herein. For example, the server 160 may be a web server and the graphical user interface 220 may be accessible to the remote devices 120 via the network (s) 150 using a web browser. In those instances, the admin user interface 220 may be accessible to the remote devices 120 using a web browser. However, in addition to communicating with the server 160 via the one or more networks 150, a remote device 120 used by an administrator may communicate with the server 160 via a direct connection. In other embodiments, the graphical user interface 220 may be provided by a software application (e.g., a smartphone application, desktop computer software, etc.) downloadable to and executable on the remote devices 120.

The database 280 stores process questions 282 and potential responses 288. The process questions 282 and the potential responses 288 may be provided via the admin user interface 290. For example, the admin user interface 220 may provide functionality to upload, specify, and/or revise process questions 282 and/or potential responses 288.

The remote devices 120 may include any computing device capable of providing the graphical user interface 220 to users of the system 200 and communicating with the server 160 to provide the information described herein. The remote devices 120 may include, for example, personal computers 124, tablet computers 126, smartphones 128, etc.

Figure 2:
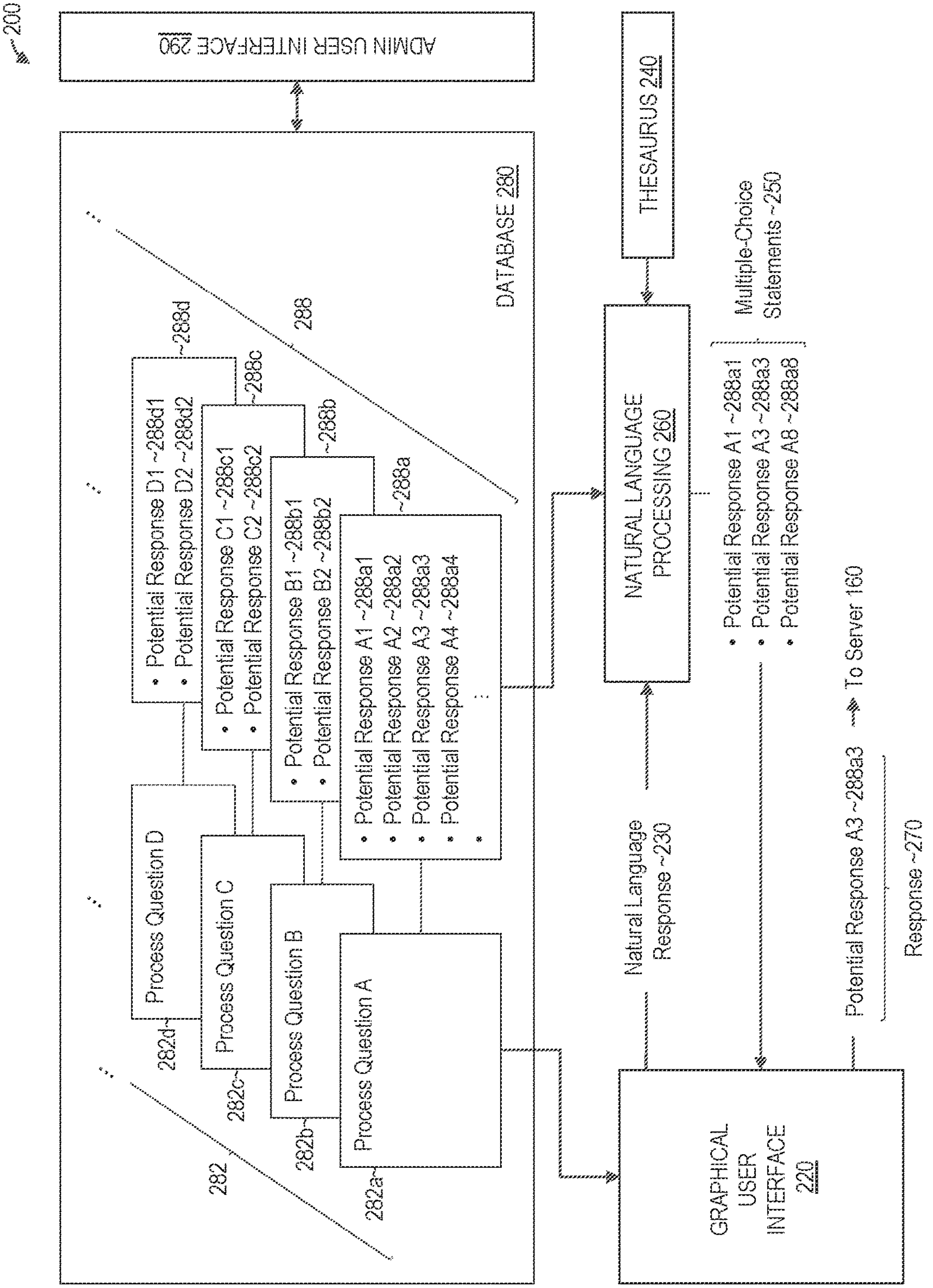
FIG. 2 is a block diagram of the system for converting natural language responses to potential multiple-choice statements according to an exemplary embodiment.

FIG. 2 is a block diagram of the system 200 according to an exemplary embodiment.

As shown in FIG. 2, the system 290 includes the admin user interface 290, the database 280, the natural language processing module 260, and the graphical user interface 220. In some embodiments, the system also includes a thesaurus 240. The database 280 and the thesaurus 240 may be stored, for example, using the external storage 180. The natural language processing module 260, the graphical user interface 220, and the admin user interface 290 may be realized by software instructions stored by the server 160 (e.g., in the computer readable storage media 168) and executed by the server 160 (e.g., by the at least one hardware processor 162).

The database 280 stores a number of process questions 282, each associated with a number of potential responses 288. The database 280 may store any number of process questions 282, which may each be associated with any number of potential responses 288. In the specific example of FIG. 2, the database 280 includes process question A **282*a*, process question B 282*b*, process question C 282*c*, and process question D 292*d*. Process question A 282*a* is associated with potential response A1 288*a*1, potential response A2 288*a*2, potential response A3 288*a*3, potential response A4 288*a*4, etc. (collectively referred to as potential responses 288*a*); process question B 282*b* is associated with potential response B1 288*b*1, potential response B2 288*b*2, etc. (collectively referred to as potential responses 288*b*); process question C 282*c* is associated with potential response C1 288*c*1, potential response C2 288*c*2, etc. (collectively referred to as potential responses 288*c*); and process question D 282*d* is associated with potential response C1 288*d*1, potential response C2 288*d*2, etc. (collectively referred to as potential responses 288*d***).

The system 200 provides functionality to pose each of the process questions 282 to users via the graphical user interface 220. (While FIG. 2 shows process question A **282*a* being posed to a user, a similar process may be used to pose any of the process questions 282.) For each process question 282, the system may also provide a context for that process question 282. A process question 282 may be, for instance, "How do you think and feel about leadership differently?" In another example, a business problem may be presented, followed by a process question 282** such as "You are the project leader, what would you do next?"

The graphical user interface 220 provides functionality for the user to provide a natural language response 230 to the process question 282 posed to the user. Because the system 220 prompts the user to provide an open-ended answer using natural language rather than selecting one of a number of multiple-choice responses, the system 200 elicits a response from the user without influencing the user by presenting the user with potential responses 288.

The natural language processing module 260 compares the natural language response 230 provided via the graphical user interface 220 to the potential responses 288 associated with the process question 282 posed to the user. The natural language processing module 260 identifies the potential responses 288 (associated with the process question 282 posed to the user) that are most similar to the natural language response 230 provided by the user. To do so, the natural language processing module 260 may compare the natural language response 230 to each potential response 288 associated with the process question 282 posed to the user and calculate a similarity score for each of those potential responses 288 using one or more natural language processing techniques. The similarity score for each potential response 288 may be calculated, for example, based on the literal similarity between the natural language response 230 and the potential response 288. In some embodiments, the natural language processing module 260 may use the thesaurus 240 to replace key words in the natural language response 230 with synonyms for those key words. In those embodiments, the similarity score for each potential response 288 may also be based on the literal similarity between the potential response 288 and the natural language response 230 with key words replaced by synonyms. The similarity score for each potential response 288 may also be based on the presence of key words in the natural language response 230 and/or the potential response 288. Finally, the similarity score for each potential response 288 may also be based on the absence of key words in the natural language response 230 and/or the potential response 288.

The subset of the potential responses 288 (associated with the process question 282 posed to the user) identified by the natural language processing module 260 as being most similar to the to the natural language response 230 provided by the user (e.g., having the highest similarity score) are displayed to the user, via the graphical user interface 220, as a set of multiple-choice statements 250. (In the specific example of FIG. 2, for instance, the natural language processing module 260 generates the multiple-choice statements 250 by comparing the natural language response 230 to the potential responses 288*a* associated with the process question 282*a* posed to the user and selects potential response A1 288*a*1, potential response A3 288*a*3, and potential response A8 288*a*8 as being most similar to the natural language response 230.)

The graphical user interface 220 provides functionality for the user to provide a response 270 to the process question 282 by selecting one of the multiple-choice statements 250. (In the specific example of FIG. 2, the user selects potential response A3 288*a*3 as the response 270 to the process question 282.) The graphical user interface 220 also provides functionality for the user to revise the natural language response 230 in order to generate a new set of multiple-choice statements 250.

In some embodiments (called an "open mode"), as the user is providing the natural language response 230 via the graphical user interface 220, the system 200 may be configured to simultaneously display the multiple-choice statements 250 that are most similar to that natural language response 230 provided by the user. In other embodiments (called a "covert mode"), the system 200 may be configured to display the multiple-choice statements 250 that are most similar to that natural language response 230 only after the user has submitted the natural language response.

The response 270 to the process question 282 provided by the user may be stored by the system 200 (e.g., in the database 280). The system 200 may then pose the next process question 282 to the user.

The admin user interface 290 provides functionality for an administrator of the system 200 to specify the process questions 282 and the potential responses 288 associated with those process questions 282. In some embodiments, the system 200 may include a machine learning module that generates additional potential responses 288 based on the potential responses 288 provided by administrators via the admin user interface 290. Additionally, the admin user interface 290 may provide functionality for administrators to configure the system 200, for example to specify a minimum length and/or maximum length of each natural language response 230, whether the system operates in the "open mode" or the "covert mode," the number of potential responses 288 included in the multiple-choice statements 250 displayed to the user, the criteria for including and/or excluding an potential responses 288 in the multiple-choice statements 250 displayed to the user, key words and phrases that increase a similarity score if present in a natural language response 230, a score associated with each potential response 288 used to evaluate the selection of that potential response 288 in response to that process question 282, etc.

Figure 3:
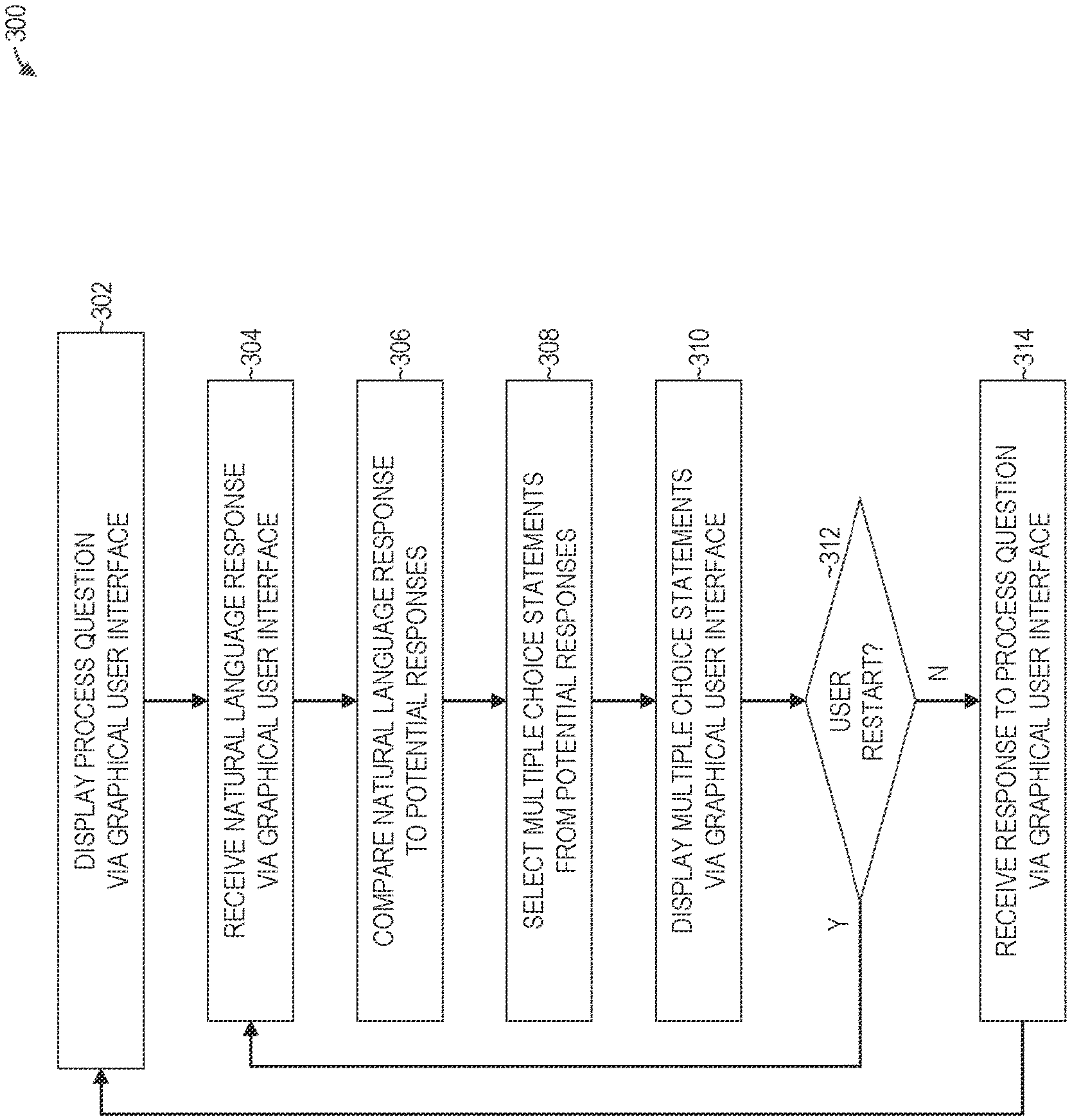
FIG. 3 is a flowchart illustrating a process for converting natural language responses to potential multiple-choice statements according to an exemplary embodiment.

FIG. 3 is a flowchart illustrating a process 300 according to an exemplary embodiment. The process 300 may be performed, for example, by a hardware computer processor 162 in response to instructions stored, for example, in the non-transitory computer readable storage media 168.

A process question 282 is displayed via the graphical user interface 220 in step 302.

A natural language response 230 to the process question 282 is received in step 304.

The natural language response 230 is compared to the potential responses 288 associated with the process question 282 by the natural language processing module 260 in step 306.

A set of multiple-choice statements 250 is selected in step 308. As described above, the multiple-choice statements 250 include the potential responses 288 (associated with the process question 282 posed to the user) that are most similar to the natural language response 230 provided by the user.

The multiple-choice statements 250 selected in step 308 are displayed to the user in step 310. In the "open mode" described above, steps 304 through 308 may be performed simultaneously so that the multiple-choice statements 250 are displayed via the graphical user interface 220 as the user is typing the natural language response 230. In the "covert mode" described above, the multiple-choice statements 250 may be selected in steps 306 and 308 and displayed to the user via the graphical user interface 220 in step 310 only after the user completes step 304 and submits the natural language response 230.

After the multiple-choice statements 250 that are most similar to the natural language response 230 are displayed in step 310, the user may revise the natural language response 230 (step 312: Yes). In those instances, the process 300 returns to step 304. Alternatively (step 312: No), the process 300 proceeds to step 314.

A response 270, selected by the user from among the multiple-choice statements 250 displayed in step 310, is received in step 314.

The process 300 may then be repeated for each of the process questions 282 until a final selection 270 is received from the user in response to each of the process questions 282.

Each potential response 288 to each process question 282 may be associated with a score indicating whether that potential response 288 is correct (or preferred, relative to the other potential responses 288 to the process question 282). Therefore, the system 200 is able to efficiently assess a large number of users, using objective criteria that remains consistent across all users, by summing the scores of the responses 270 provided by each user.

Additionally, because users respond to the process questions 282 using natural language (and are only presented with multiple-choice statements 250 that are similar to their natural language responses 230), the system 200 prevents potential responses 288 to each process question 282 from influencing the response 270 provided by the user. Accordingly, the system 200 is better able to assess the capacity of users to make decisions in situations where they are not presented with a limit set of options.

As briefly mentioned above, evaluating the natural language responses 230 to open ended process questions 282 is particularly challenging when the users do not all use the same dialect. Meanwhile, organizations may wish to evaluate geographically dispersed users that use a variety of different dialects and, in some instances, speak a variety of different languages. Therefore, in some embodiments, the system 200 includes a thesaurus-based natural language processing (NLP) process 400 that enables organizations to evaluate users regardless of the dialect used by those users.

Figure 4:
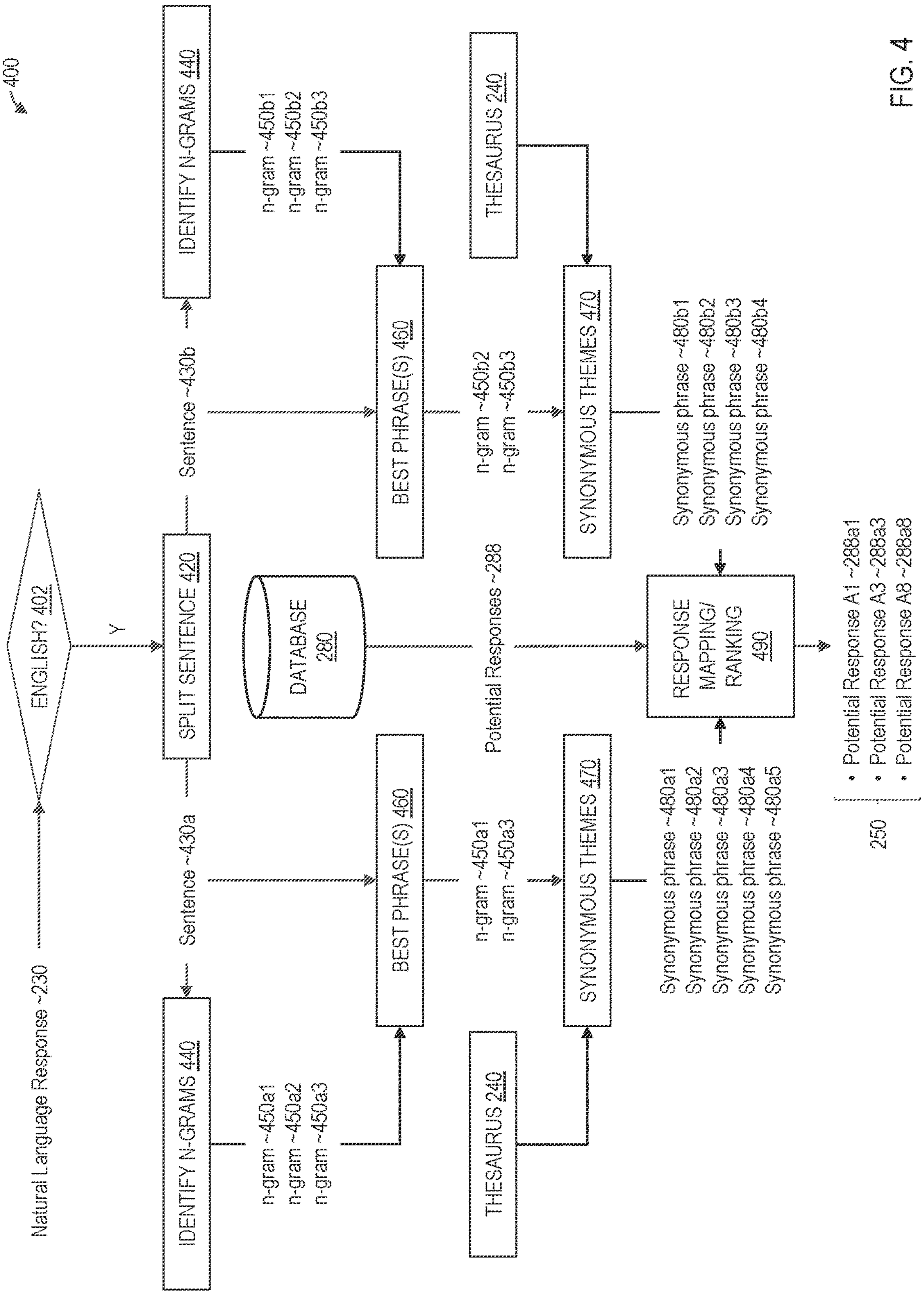
FIG. 4 is a flowchart illustrating a universal sentence encoding process according to an exemplary embodiment.

FIG. 4 is a flowchart illustrating the thesaurus-based NLP process 400 according to an exemplary embodiment. The process 400 may be performed, for example, by a hardware computer processor 162 in response to instructions stored, for example, in the non-transitory computer readable storage media 168.

In step 402, it is determined whether the natural language response 230 received from the user via the graphical user interface 220 was written in English (step 402: Yes). To determine whether the natural language response 230 was written in English, for example, the system 200 may search for each word in the natural language response 230 in an English language dictionary (e.g., the Worldnet Lexical Database) and determine whether at least half of the words in the natural language response 230 are found in the English language database. If the natural language response 230 was not written in English (step 402: No), the user may be prompted to answer the process question 282 in English. Alternatively, in some embodiments, the system 200 may recognize that the natural language response 230 was written in another language and perform a similar process 400 as described below to identify the multiple-choice statements 250 that are most similar to the natural language response 230 using a database 280 of potential responses 288 written in the language of the user.

Because natural language responses 230 often include multiple sentences, the natural language response 230 may be split into multiple sentences 430*a*, 430*b*, etc. in step 420. To do so, special characters (periods, semicolons, etc.) and terms (e.g., "and", "but", etc.) may be recognized as sentence separators and each string separated by those separators may be evaluated as separate sentences 430.

For each sentence 430, each series of n consecutive words (n-grams 450) are identified in step 440. For example, in the sentence 430 "I like coffee and tea," the 3-grams 450 would be "I like coffee", "like coffee and", and "coffee and tea."

For each n-gram 450 identified in each sentence 430, the natural language processing module 260 identifies the one or more n-grams 450 that are semantically similar to the sentence 430 in step 460. For example, the natural language processing module 260 may employ a semantic similarity algorithm and identify the one or more n-grams 450 having a similarity score (e.g., cosine similarity) equal to or greater than a predetermined threshold (e.g., 0.6).

In step 470, each word in the n-gram(s) 450 that are semantically similar to the sentence 430 are passed through the thesaurus 240 (e.g., the Worldnet Lexical Database) to identify all synonyms for each of those words and all combinations of the n-gram(s) 450 (that are semantically similar to the sentence 430 combinations) and the identified synonymous words (synonymous phrases 480) in step 470. Using the example n-gram 450 of "I like coffee," for instance, a synonym for "I" may be "Iodine," a synonym for "like" may be "enjoy," and a synonym for "coffee" may be "java," and the synonymous phrases 480 may include "I like coffee," "Iodine like coffee," "I enjoy coffee," "Iodine enjoy coffee," "I like java," "Iodine like java," "I enjoy java," and "Iodine enjoy java." By identifying all of the synonymous phrases 480 that include all of the words in the n-gram(s) 450 and all of the synonyms for those words, the universal sentence encoding process 400 enables the system 200 to evaluate the natural language responses 230 of users regardless of the dialect used by those users.

For each natural language response 230, the natural language processing module 260 identifies the potential responses 288 to the process question 282 that are most semantically similar to the sentences 430 identified in the natural language response 230 and the synonymous phrases 480 generated using those sentences 430 in step 490. To do so, for each potential response 288 to the process question 282, the natural language processing module 260 employs a semantic similarity algorithm to calculate a similarity score (e.g., cosine similarity) with respect to each sentence 430 identified in the natural language response 230 and each of the synonymous phrases 480 generated using those sentences 430 and identifies and outputs the potential responses 288 having the highest similarity scores.

In some embodiments, the natural language processing module 260 may identify the potential responses 288 having the highest similarity scores with respect to all of the sentences 430 identified in the natural language response 230 and each of the synonymous phrases 480 generated using those sentences 430 (e.g., the highest sum or average of all similarity scores). In preferred embodiments, however, the natural language processing module 260 identifies the potential responses 288 having the highest single similarity score with respect to any of the sentences 430 identified in the natural language response 230 or any of the synonymous phrases 480 generated using those sentences 430. In some embodiments, for natural language responses 230 having multiple sentences, the natural language processing module 260 identifies a predetermined number of potential responses 288 having the highest similarity score with respect to any of those sentences 430. In other embodiments, the natural language processing module 260 identifies a predetermined number of potential responses 288 for each sentence 430 identified in the natural language response 230.

As described above with reference to FIGS. 2 and 3, the potential responses 288 having the highest similarity scores are output to the user via the graphical user interface 220 as a set of multiple-choice statements 250, which provides functionality for the user to either select one of the multiple-choice statements 250 or revise their natural language response 230. In some embodiments, a single set of multiple-choice statements 250 is generated using all of the sentences 430 identified in the natural language response 230 (that includes the potential responses 288 having the highest similarity scores generated using any of the sentences 430). In preferred embodiments, however, a set of multiple-choice statements 250 is generated for each of the sentences 430 identified in the natural language response 230 (that includes the potential responses 288 having the highest similarity scores generated using the sentence 430).

While preferred embodiments have been described above, those skilled in the art who have reviewed the present disclosure will readily appreciate that other embodiments can be realized within the scope of the invention. Accordingly, the present invention should be construed as limited only by any appended claims.

What is claimed is:

1. A method of converting natural language responses to potential multiple-choice statements, the method comprising:

storing a plurality of questions, each question associated with a plurality of potential responses, each potential response being associated with a score used to evaluate selection of the potential response in response to the question;

selecting one of the questions associated with a plurality of potential responses;

displaying the selected question to a user via a graphical user interface;

providing functionality, via the graphical user interface, for the user to provide a natural language response to the selected question associated with the plurality of potential responses;

using a semantic similarity algorithm to calculate similarity scores indicative of the semantic similarity between the natural language response provided by the user and each of the potential responses by:

for a predetermined value of n, identifying each n-gram in the natural language response provided by the user;

using the semantic similarity algorithm to calculate similarity scores indicative of the semantic similarity between each identified n-gram and the natural language response provided by the user;

selecting one or more identified n-grams having similarity scores that are greater than or equal to a predetermined threshold;

identifying synonyms for each of the word in the selected n-grams;

identifying synonymous phrases that include each combination of the words in the one or more selected n-grams and the identified synonyms; and using the semantic similarity algorithm to calculate similarity scores indicative of the semantic similarity between the potential response associated with the question and the synonymous phrases identified using the natural language response provided by the user;

outputting, via the graphical user interface, a set of multiple-choice statements that include the potential responses associated with the selected question having the highest similarity scores indicative of the semantic similarity between the potential responses and the natural language response provided by the user; and providing functionality for the user to respond to the selected question by selecting one of the multiple-choice statements output via the graphical user interface.

2. The method of claim 1, wherein calculating the similarity score indicative of the semantic similarity between the natural language response and each of the potential responses comprises:

identifying a plurality of sentences in the natural language response; and for each of the plurality of sentences:

identifying each n-gram in the sentence;

using the semantic similarity algorithm to calculate similarity scores indicative of the semantic similarity between each of the identified n-grams and the sentence;

selecting one or more identified n-grams having a similarity score that is greater than or equal to the predetermined threshold;

identifying synonyms for each of the words in the selected n-grams;

identifying synonymous phrases that include each combination of the words in the one or more selected n-grams and the identified synonyms;

using the semantic similarity algorithm to calculate similarity scores indicative of the semantic similarity between the potential responses associated with the question and the synonymous phrases.

3. The method of claim 2, wherein outputting the set of multiple-choice statements comprises outputting a set of multiple-choice statements for each sentence that include the potential responses associated with the selected question having the highest similarity scores indicative of the semantic similarity between the potential responses and the sentence.

4. The method of claim 1, wherein the semantic similarity algorithm selects the one or more identified n-grams having cosine similarity scores that are greater than or equal to the predetermined threshold.

5. The method of claim 1, wherein the semantic similarity algorithm identifies the set of multiple-choice statements by selecting the potential responses associated with the selected question having the highest cosine similarity scores.

6. The method of claim 1, wherein the graphical user interface provides functionality for the user to respond to the selected question by selecting one of the multiple-choice statements output via the graphical user interface or revising the natural language response to the selected question.

7. The method of claim 1, further comprising:

selecting a plurality of questions;

providing functionality for the user to answer each of the selected questions by providing natural language responses and selecting one of the identified potential responses; and evaluating the user by summing the scores associated with each of the potential responses selected by the user.

8. A system for converting natural language responses to potential multiple-choice statements, comprising:

non-transitory computer readable storage media that stores a plurality of questions, each question associated with a plurality of potential responses, each potential response being associated with a score associated with used to evaluate selection of the potential response in response to the question;

a graphical user interface that outputs a selected question associated with a plurality of potential responses to a user and provides functionality for the user to provide a natural language response to the selected question associated with the plurality of potential responses; and a hardware computer processing unit that:

uses a semantic similarity algorithm to calculate similarity scores indicative of the semantic similarity between the natural language response provided by the user and each of the potential responses by:

for a predetermined value of n, identifying each n-gram in the natural language response provided by the user;

using the semantic similarity algorithm to calculate similarity scores indicative of the semantic similarity between each identified n-gram and the natural language response provided by the user;

selecting one or more identified n-grams having similarity scores that are greater than or equal to a predetermined threshold;

identifying synonyms for each of the word in the selected n-grams;

identifying synonymous phrases that include each combination of the words in the one or more selected n-grams and the identified synonyms; and using the semantic similarity algorithm to calculate similarity scores indicative of the semantic similarity between the potential response associated with the question and the synonymous phrases identified using the natural language response provided by the user;

outputs, via the graphical user interface, a set of multiple-choice statements that include the potential responses associated with the selected question having the highest similarity scores indicative of the semantic similarity between the potential responses and the natural language response provided by the user; and provides functionality for the user to respond to the selected question by selecting one of the multiple-choice statements output via the graphical user interface.

9. The system of claim 8, wherein the hardware computer processing unit uses the semantic similarity algorithm to calculate similarity scores indicative of the semantic similarity between the natural language response provided by the user and each of the potential responses by:

identifying a plurality of sentences in the natural language response; and for each of the plurality of sentences:

identifying each n-gram in the sentence;

using the semantic similarity algorithm to calculate similarity scores indicative of the semantic similarity between each of the identified n-grams and the sentence;

selecting one or more identified n-grams having a similarity score that is greater than or equal to the predetermined threshold;

identifying synonyms for each of the word in the selected n-grams;

identifying synonymous phrases that include each combination of the words in the one or more selected n-grams and the identified synonyms; and using the semantic similarity algorithm to calculate similarity scores indicative of the semantic similarity between the potential responses associated with the question and the synonymous phrases.

10. The system of claim 9, wherein the hardware computer processing unit outputs the set of multiple-choice statements by outputting a set of multiple-choice statements for each sentence that include the potential responses associated with the selected question having the highest similarity scores indicative of the semantic similarity between the potential responses and the sentence.

11. The system of claim 8, wherein the semantic similarity algorithm:

selects the one or more identified n-grams having cosine similarity scores that are greater than or equal to the predetermined threshold; and identifies the set of multiple-choice statements by selecting the potential responses associated with the selected question having the highest cosine similarity scores.

12. The system of claim 8, wherein the graphical user interface provides functionality for the user to respond to the selected question by selecting one of the multiple-choice statements output via the graphical user interface or revising the natural language response to the selected question.

* * * * *